Dec. 9, 1969     W. SCHLUTER ETAL     3,482,892
ANTIFRICTION BEARING

Filed April 11, 1968     3 Sheets-Sheet 1

INVENTORS
Wilhelm Schluter
Heinz Pöhler
BY
Michael S. Striker
ATTORNEY

INVENTORS
Wilhelm Schluter
Heinz Pöhler
BY
Michael S. Striker
ATTORNEY

Dec. 9, 1969   W. SCHLUTER ETAL   3,482,892
ANTIFRICTION BEARING

Filed April 11, 1968   3 Sheets-Sheet 3

INVENTORS
Wilhelm Schluter
Heinz Pöhler
BY
Michael S. Striker
ATTORNEY

United States Patent Office
3,482,892
Patented Dec. 9, 1969

3,482,892
ANTIFRICTION BEARING
Wilhelm Schluter, Dortmund, and Heinz Pohler, Herdecke-Kirchende, Germany, assignors to Eisenwerk Rothe Erde G.m.b.H., Dortmund, Germany
Filed Apr. 11, 1968, Ser. No. 730,211
Claims priority, application Germany, Apr. 15, 1967, E 37,803
Int. Cl. F16c 17/06, 17/08, 19/10
U.S. Cl. 308—227
10 Claims

ABSTRACT OF THE DISCLOSURE

An antifriction bearing includes an inner bearing ring having a first annular surface. An outer bearing ring surrounds the inner bearing ring and has a second annular surface spaced from the first annular surface. Three ball races are provided on the first surface and three additional ball races are provided on the second surface. A single row of bearing balls is disposed between the ball races.

Background of the invention

The present invention relates to an antifriction bearing, and more particularly to an antifriction bearing of the type having a single row of bearing balls.

In many applications, for instance in such heavy machinery as cranes, radar antennas, vehicles with heavy turnable superstructures, or the like, the antifriction bearings which are employed must be capable of withstanding axial as well as radial stresses, and momentary loads resulting from eccentrically acting loading forces. In such applications it is known to use antifriction bearing having double rows of bearing balls or others having single rows of bearing balls and which are known as four-point bearings.

It will be appreciated that an eccentric axial load acting on any antifriction bearing would subject the bearing sector facing the axial load to a pressure which is greater by a factor corresponding to the axial load than the tensile force which acts upon the bearing sector facing away from the axial load, it being remembered that the axial load acts eccentrically.

Under these conditions, single-row ball bearings have the disadvantage, as compared to double-row bearings that the various different forces acting upon them must all be withstood by the same portions of the raceway, a fact which makes it difficult to calculate the static and dynamic load absorption as well as the determination of the bearing lifetime.

Attempts were made to overcome the existing problems by constructing one-row ball bearings wherein the raceway accepting the main axial load was carried beyond the center of the bearing balls. However, in case of eccentric loads of such bearing it has not been possible to prevent "tumbling" of the bearing balls resulting from the fact that these change their direction of rotation upon advancing over that side of the race surface which is freed from load under the influence of the prevailing eccentric thrust. The superposed axial load, radial load and moment load results in a change of the contact angle between the bearing balls and the ball race surface which in turn leads to speed differentials between the bearing balls which cannot always be absorbed by elastic ball distancing members.

It is thus a general object of the present invention to overcome the aforementioned disadvantages of the prior art.

A more particular object of the invention is to provide an antifriction bearing having kinematic and load factors appropriate for the respectively applied load.

Summary of the invention

In accordance with one feature of our invention, we provide an antifriction bearing which comprises an inner bearing ring having a first annular surface. An outer bearing ring surrounds the inner bearing ring and has a second annular surface spaced from the first annular surface. A first set of three radially spaced ball races is provided on the first surface and a second set of three additional radially spaced ball races is provided on the second surface axially spaced from the first set. A single row of antifriction bearing balls is received between the ball races of the first and the second surface rolling therealong.

It would be appreciated that for instance the inner one of the bearing rings may be split, that is that it may consist of two annular portions, the main concept according to the present invention being that each ring be provided with three bearing ball races. By resorting to our invention, we obtain, particularly in the large majority of applications where the axial load predominates, a proper guidance and load acceptance of the bearing balls whose axis of rotation can be predetermined in advance because the points of engagement of the bearing balls with the ball races can be exactly predetermined. Furthermore, if a bearing according to the present invention is subjected to centrally acting axial loads, the developments of additional radial forces in the bearing race system which could lead to deformation of the ball races, to excessive clearance of the bearing balls, or even to destruction of the ball races, is avoided. For this reason, the bearing according to our present invention may be significantly smaller in radial cross-section.

The ball races may be constituted by wire races, and it is pointed out that each set need include only two wires if one of the two wires is constructed and configurated to provide two ball races thereon. Alternatively, the ball races can be provided as projecting annuli on the respective surfaces of the bearing rings.

The novel features which are considered as characteristic for the invention are set forth in particular in the appended claims. The invention itself, however, both as to its construction and its method of operation, together with additional objects and advantages thereof, will be best understood from the following detailed description of specific embodiments when read in connection with the accompanying drawings.

Description of the preferred embodiments

Figure 1:
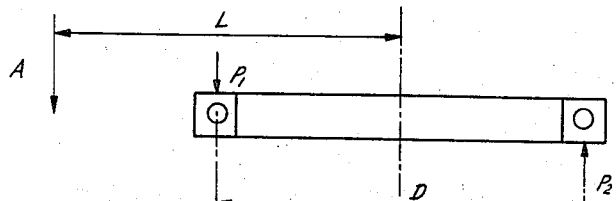
FIG. 1 is a diagrammatic view showing in principle the most common loading of bearings of the type hereinunder discussion.

Discussing now the drawing in detail, and firstly FIG. 1 thereof, it will be seen that the perhaps most common loading of bearings of the type hereunder discussion involves a force A which acts eccentrically with the distance L and which produces a moment with the eccentrically acting axial load A exerting a pressure $P_1$ on that sector of the bearing facing the load, which pressure $P_1$ is larger by the factor of the axial load A than the tensile force $P_2$ which acts upon that sector of the bearing facing away from the axial load.

Figure 2:
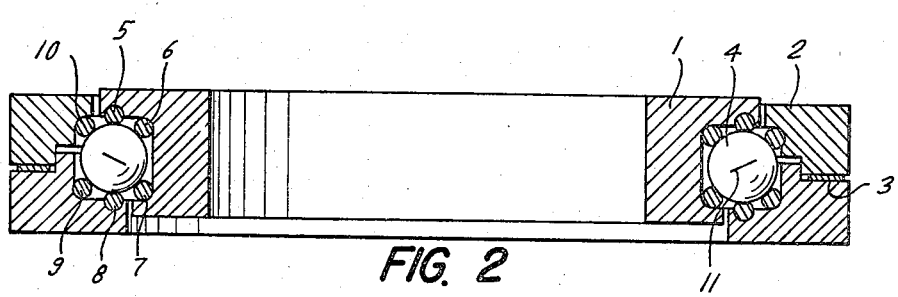
FIG. 2 is an axial section through a bearing according to our invention, the ball races being provided in form of wire races arranged for accepting a normal load.

Given these circumstances it will be seen that the bearing according to the present invention and as illustrated in FIG. 2 includes an inner bearing ring 1, a split or two-piece outer bearing ring 2, with shims 3 interposed between the respective annular surfaces on the bearing rings 1 and 2. A single row of bearing balls 4 is provided and a plurality of wire ball races 5, 6, 7, 8, 9 and 10 are provided.

The wire ball races 6, 7, 9 and 10 are known from the art in that they are provided in known ball bearings. According to the present invention, however, we additionally provide the wire bearing races 5, 8 which are arranged for accepting the highest axial loads which predominantly act in one direction. Reference numeral 11 identifies the respective axis of rotation of the individual bearing balls 4.

To precisely preset the clearance of the bearing balls 4, the ball race 7 is arranged to obtain the desired clearance and the spacing of the ball race 10 from the bearing balls 4 is effected in the desired manner via the shims 3 or, if desired, by removing material from the associated annular surface of the respective bearing ring.

Figure 3:
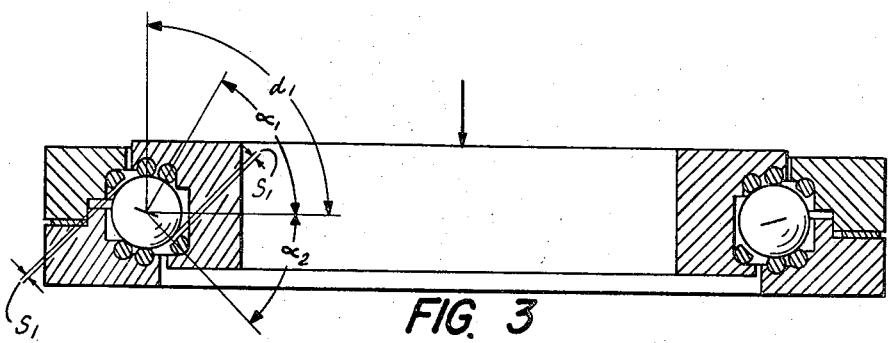
FIG. 3 is a view similar to FIG. 2, also utilizing wire races, but with the ball races arranged for a predominantly axial load.

The first angle of the wire ball races is selected in accordance with the respective load requirement that the forces acting upon the bearing are transmitted through the system in a line of force application which extends parallel to the acting forces or at the lowest possible angle thereto. FIG. 3 shows a situation where the axial load predominates in which case the wire bearing races 5 and 8 are made to approach one another in a first angle $\alpha_1$ of 90 degrees, if possible, and the wire bearing ball races 6 and 9 are made to approach the wire bearing races 5 and 8 as much as possible.

Figure 4:
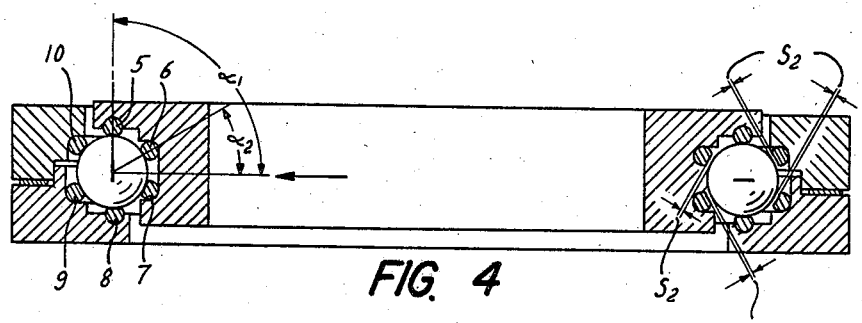
FIG. 4 is a view similar to FIG. 2 but showing the wire ball races arranged for a predominantly radial load.

If a radial load predominates, that is in the situation illustrated in FIG. 4, the wire ball races 6, 7 and 9, 10 are arranged as close as possible to one another.

Figure 5:
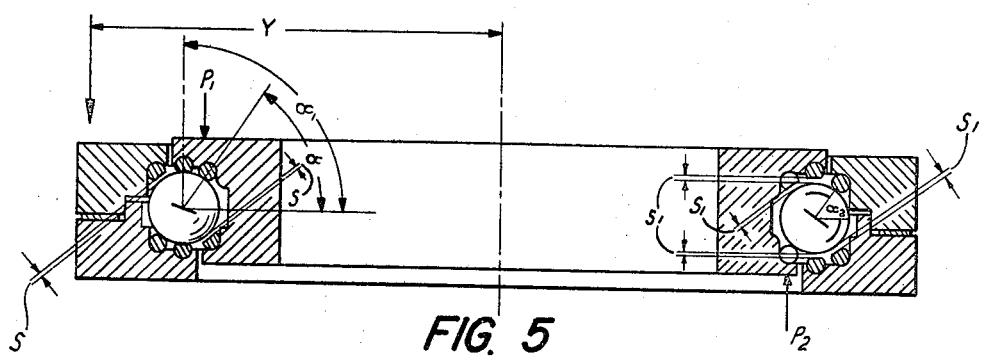
FIG. 5 is a view similar to FIG. 2 but showing the wire ball races arranged for a moment load resulting from axial loading.

FIG. 5 shows the situation where axial load predominates and results in a pitching or tilting moment, and in this case the first angles of the wire ball races 5 and 8 are made to approach 90 degrees, and those of the wire ball races 7 and 10 are selected as large as possible to assure the most nearly equal loading of all ball races.

Figure 6:
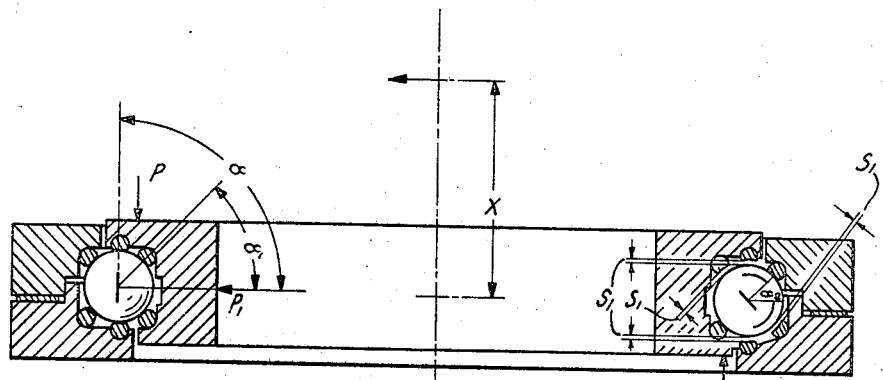
FIG. 6 is a view similar to FIG. 5 but showing the wire ball races arranged for a moment load resulting from radial loading.

FIG. 6 illustrates how the various wire ball races are arranged if the bearing is to absorb a predominantly acting moment load from a radial load $P_1$.

Figure 7:
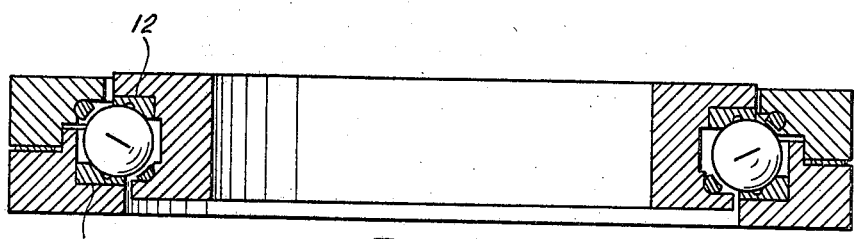
FIG. 7 is a view similar to FIG. 2 but showing two ball races of each set of three ball races provided on a single wire race.

The illustration in FIG. 7 that is not necessary to provide each set of ball races with three individual wire races. Rather, each set may be constituted by two wire races if one wire race of each set, namely those designated with reference numerals 12 and 13 in FIG. 7, is so constructed as to provide two separate race surfaces which respectively contact the bearing balls 4. In other respects FIG. 7 corresponds to the construction shown and discussed before in FIGS. 2–6.

Figure 8:
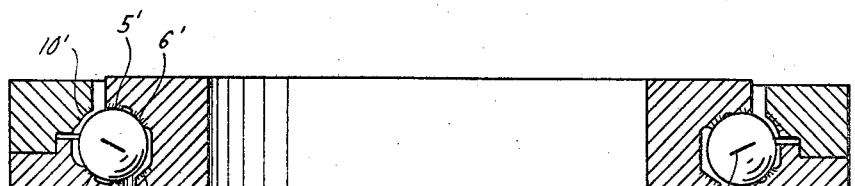
FIGS. 8–12 respectively correspond to FIGS. 2–6 but with the ball races constituted by raised annular portions of the respective annular surfaces provided on the bearing rings.
Figure 9:
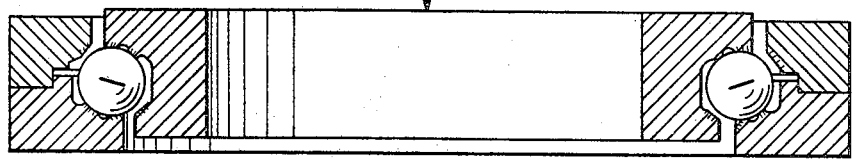
Figure 10:
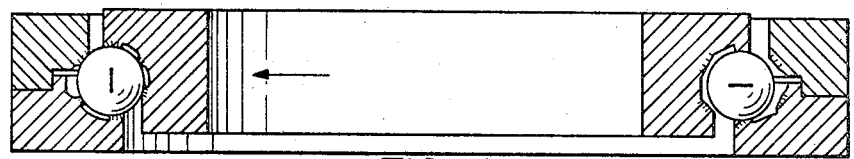
Figure 11:
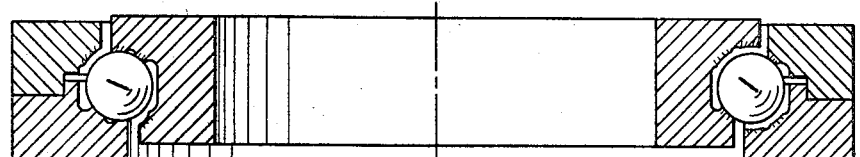
Figure 12:
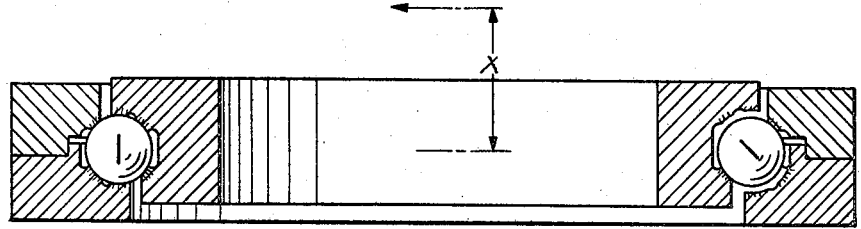

The constructions illustrated in FIGS. 8–12 are largely self-explanatory and will not be discussed in detail. It will be sufficient to state that in FIGS. 8–12 the wire bearing races of FIGS. 2–6 have been replaced with raised annular bearing surfaces which project from the respective annular surface of the inner and outer bearing rings 1 and 2. In all other respects, FIG. 8 corresponds to FIG. 2, that is the construction shown in FIG. 8 is intended for the load-absorbing characteristics as that of FIG. 2. By the same token FIG. 9 corresponds to FIG. 3, FIG. 10 corresponds to FIG. 4, FIG. 11 corresponds to FIG. 5, and FIG. 12 corresponds to FIG. 6. As far as reference numerals are concerned it is to be noted that in FIG. 8 the same reference numerals are employed as in FIG. 2 but with a prime symbol added. No reference numerals have been utilized in FIGS. 9–12, because the elements shown therein are identical with those shown in FIG. 8, and it is believed that the addition of reference numerals would detract from an understanding of the slight variations in the position of the various elements in these figures.

If wire bearing ball races are replaced with these raised annular race surfaces as shown in FIGS. 8–12 it will be necessary to surface-harden these raised bearing surfaces $5'$–$10'$. The bearing according to our invention provides satisfactory kinematic rolling conditions and permits exact determination of the loading components, the thrust angle and the bearing play or clearance. Furthermore, it is possible with this bearing to calculate the speed differentials of the bearing balls and to compensate by appropriately varying the elasticity of the distancing members between the bearing balls. This, as well as the fact that our bearing permits the use of bearing rings having small cross-sectional areas as seen in radial direction, results in a construction which represents a significant advance in this field and for the purposes discussed.

It will be understood that each of the elements described above, or two or more together, may also find a useful application in other types of bearing constructions differing from the types described above.

While the invention has been illustrated and described as embodied in an antifriction bearing, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. An antifriction bearing comprising, in combination, inner bearing ring means having a first annular surface; outer bearing ring means surrounding said inner bearing ring means and having a second annular surface spaced from said first annular surface; first race means provided on said first surface and defining a first set of three axially spaced ball races; second race means provided on said second surface and defining a second set of three axially spaced ball races spaced from said first set; and a row of antifriction bearing balls received between said ball races of said first and second sets.

2. A bearing as defined in claim 1, wherein said first and second race means each comprise three wire races constituting said ball races.

3. A bearing as defined in claim 1, wherein said first and second race means each comprise two wire races, one of said wire races of each race means constituting a single ball race and the other wire of each race means constituting a dual ball race.

4. A bearing as defined in claim 1, said race means each comprising three raised ring-shaped contact surfaces provided on the respective annular surfaces, each of said contact surfaces constituting one of said ball races.

5. A bearing as defined in claim 1, at least some of said means consisting of non-rusting material.

6. A bearing as defined in claim 1, at least some of said means consisting of lightweight metallic material.

7. A bearing as defined in claim 1, wherein said bearing balls between said ball races roll at differential speeds; and further comprising elastic spacer means intermediate adjacent ones of said bearing balls and being possessed of elastic compressibility of a magnitude selected in dependence upon the dfferential speads of the respectively adjoining bearing balls.

8. A bearing as defined in claim 1, wherein the inner and the outer ball race of each set are spaced from the associated center ball race of the respective set by a distance selected in dependence upon the magnitude and type of load which the bearing is to carry.

9. A bearing as defined in claim 1, wherein at least one ball race of each set of ball races is slightly spaced from and out of contact with said bearing balls in non-loaded condition of said bearing.

10. A bearing as defined in claim 4, wherein said contact surfaces have a hardness greater than the remainder of the respective annular surfaces.

References Cited

UNITED STATES PATENTS 3,081,135  3/1963  Olson _____ 308—227

MARTIN P. SCHWADRON, Primary Examiner

FRANK SUSKO, Assistant Examiner